Patented Oct. 4, 1927.

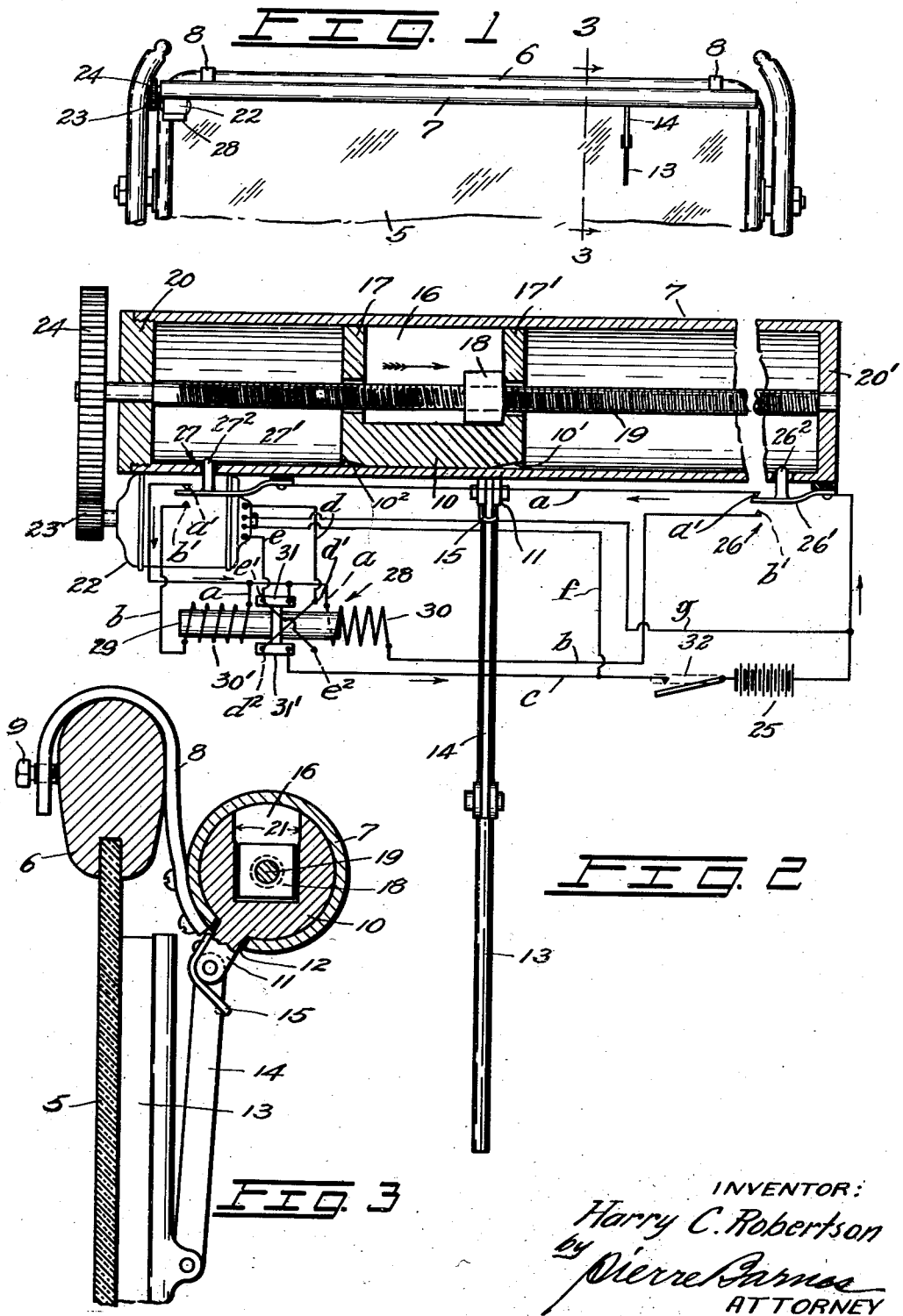

1,644,545

UNITED STATES PATENT OFFICE.

HARRY C. ROBERTSON, OF SEATTLE, WASHINGTON.

POWER-OPERATED WINDOW-CLEANING DEVICE.

Application filed October 4, 1921. Serial No. 505,346.

This invention relates to power actuated devices for wiping dust, rain, etc., from the outer sides of windows on vehicles to afford an unobstructed view of the road or track in front of the same.

The object of the invention is the provision of a device of this charater of inexpensive and durable construction and which will be efficient in operation and convenient to use.

The invention consists in the novel construction, adaptation and combination of parts hereinafter described and claimed.

In the accompanying drawings,—

Figure 1 is a front elevation of apparatus embodying my invention applied to the windshield of an automobile. Fig. 2 is a view partly in longitudinal vertical section and partly in front elevation of the apparatus shown detached, the electrical operating connections being illustrated diagrammatically. Fig. 3 is a sectional view through 3—3 of Fig. 1.

In said drawings, the reference numeral 5 represents the glass and 6 the frame of an automobile windshield.

According to the present invention I provide a tubular casing 7 which, as shown, is provided with hook attachments 8 for engaging over the windshield frame 6 and to which said hooks are rigidly secured as by means of clamping screws such as 9 in Fig. 3. Provided for axial reciprocating movements within the casing 7 is a block or carrier 10 having rigid therewith an arm 11 which extends through a slot 12 provided in the lower portion of the casing.

13 represents a window wiper of any well known suitable type which is connected by a link 14 with the carrier arm 11 and is yieldingly held in contact with the windshield glass as by means of a spring 15.

The carrier 10 is provided with a rectangular shaped recess or chamber 16 between two end walls 17 and $17^1$ to receive a nut 18 which takes upon a screw threaded shaft 19 disposed axially of the casing and journaled in the ends 20 and $20^1$ of the latter.

The nut 18 is prevented by the chamber walls 21 from rotating and is less length than the chamber to afford a limited travel to the nut independent of carrier in the successive movements of the nut and carrier.

Rigidly secured to the casing adjacent to one of its ends is an electric motor 22 which serves to rotate the shaft 19 through the medium of power transmitting devices, such for example, as a spur pinion 23 on the motor shaft and a spur gear 24 on the driven shaft 19. 25 represents an electric battery for supplying current to operate the motor. The circuit connections between said battery and motor includes means influenced by the carrier to control the electric current to effect the reversal of the motor for the purpose of imparting reciprocatory movements to the carrier and the wiper which is connected thereto.

Provided adjacent to opposite ends of the casing are two-point switches 26 and 27 having their gap closing members $26^1$ and $27^1$ resiliently held to normally close the main circuit containing said battery and the motor. Included in said main circuit is a reversing switch 28 of the solenoid type having its core designated by 29 and the windings by 30 and $30^1$. Said windings are respectively connected from one end of each by leads $a$ with the contacts $a^1$ of switches 26 and 27 pertaining to the main circuit and are connected from their other ends by leads $b$ with the complementary contacts $b^1$ of the switches 26 and 27.

The solenoid core 29 carries electrically coupled bridge elements 31 and $31^1$ and are respectively connected to a lead $a$ and the circuit wire $c$ leading back to battery through the medium of a cut out switch 32. $d$ and $e$ represent leads extending from the motor and provided with contacts $d^1$, $d^2$ and $e^1$, $e^2$ which are adapted to be brought into electrical connection with the leads $a$ and $c$ through the medium of said bridge elements when the solenoid core is actuated by energizing one or the other of said windings.

It will be understood that the wires $d$, $e$ are connected to the brushes or the field coil leads to the motor 22, and that the switch structure 31, $31^1$ functions to reverse the polarity of the said wires. The brushes or field coils not connected to the wires $d$, $e$, are connected to the wires $g$, $f$ and receive current directly from the battery 25, the switch 32 being the only control for these wires. It will now be understood that the direction of rotation of the motor 22 will be governed by the polarity of the wires $d$, $e$.

These windings are alternately rendered effective by properly influencing the switch members $26^1$ and $27^1$ through the medium of studs $26^2$ and $27^2$ thereon being engaged against cam faces $10^1$ and $10^2$ provided on said carrier as the latter approaches into proximity of the casing ends.

For operating the device the switch 32 is closed to complete the circuit for driving the motor for rotating the shaft 19 through the medium of the transmission gears 23 and 24. When shaft 19 is thus rotated the screw threads thereon act in the nut 18 to propel the same for urging the carrier 10 and the window wiper 13 toward one or the other end of the casing according to the direction of rotation of the shaft.

Said carrier is reciprocated to cause the window wiper to travel to and fro across the front of the window by reversing direction of the rotation of the driving shaft and which is accomplished by reversing the current with respect to the motor to drive the latter in opposite directions alternately. The reversing of the current is attained by the carrier engaging a switch stud $26^2$ or $27^2$ to cause the associated switch member $26^1$ or $27^1$ to open the main circuit having terminals $a^1$ and closing one or the other of the supplementary circuits including the solenoid windings 30 and $30^1$ respectively. For example, with the carrier of the cleaning wiper traveling toward the right (Fig. 2), when the carrier cam face $10^1$ encounters stud $26^2$ the switch member $26^1$ is brought from the associated contact $a^1$ to $b^1$, whereupon, the current will proceed through the solenoid winding 30, draw the core 29 into position to transpose the bridge members 31 and $31^1$ into positions to connect the leads $a$ and $c$ respectively with terminals $d^1$ and $e^2$ instead of with $e^1$ and $d^2$ as shown, to thereby reverse the current with relation to the motor as will be understood.

By reason of the space between the carrier walls 17 and $17^1$ exceeding the length of the nut 18, the nut is compelled to travel some distance on the shaft 19 before engaging the carrier to convey the same in reverse directions. This function of the invention is an important one as it enables the motor to start without a load in the successive reversals thereof thereby requiring a smaller motor and less power for operating.

The invention will, it is thought, be understood from the foregoing description.

What I claim, is:—

1. Means for reciprocating a cleaner, comprising a carriage, means for supporting and guiding said carriage, a screw extending through the carriage, power driven means for rotating said screw successively in opposite directions, and a non-rotating nut provided on said screw for operatively connecting the same to the carriage for propelling the carriage, said nut being arranged for limited movement with said screw independently of the carriage upon each reversal of the screw rotary movement.

2. Means for reciprocating a cleaner, comprising a cylindrical casing having a longitudinal slot, a carriage movable in the casing and having an arm extending through the slot, a screw threaded shaft extending axially into said casing and through said carriage, a nut taken on the screw shaft and engageable against spaced abutments provided on the carriage for propelling the latter, electrically operated means for rotating said shaft, and devices actuated by the movement of said carriage when it approaches the end of its travel for effecting the reversal of said means to afford reciprocatory movements to the carriage.

3. Means for reciprocating a cleaner, comprising a chambered carriage, means to guide said carriage, a power driven screw extending through said carriage, means to reverse the rotary movement of said screw, a carriage propelling nut taken on said screw within the carriage chamber and of less length than the latter whereby the nut is moved independently of the carriage in the early portion of the reversing movement of the screw.

Signed at Seattle, Washington, this 28th day of September 1921.

HARRY C. ROBERTSON.